United States Patent [19]
Watanabe et al.

[11] Patent Number: 5,319,845
[45] Date of Patent: Jun. 14, 1994

[54] ASSEMBLING APPARATUS USING ROBOT

[75] Inventors: Tadashi Watanabe; Toshikazu Saiga; Kiyohiko Akanuma, all of Kanagawa, Japan

[73] Assignee: Sony Corporation, Japan

[21] Appl. No.: 962,091

[22] Filed: Oct. 16, 1992

[30] Foreign Application Priority Data

Oct. 18, 1991 [JP] Japan .................................. 3-297995

[51] Int. Cl.⁵ ............................................. B23P 21/00
[52] U.S. Cl. ....................................... 29/701; 29/711; 29/714; 29/784; 29/799
[58] Field of Search ................. 29/701, 711, 712, 714, 29/720, 721, 783, 784, 786, 791, 793, 799

[56] References Cited

U.S. PATENT DOCUMENTS

| | | | |
|---|---|---|---|
| 2,896,314 | 7/1959 | Godwin et al. | 29/784 X |
| 3,796,327 | 3/1974 | Meyer et al. | 29/799 X |
| 4,673,075 | 6/1987 | Veyama et al. | 29/799 X |
| 4,894,908 | 1/1990 | Haba, Jr. et al. | 29/784 X |
| 5,079,829 | 1/1992 | Yoshiji et al. | 29/784 X |
| 5,182,850 | 2/1993 | Kondo et al. | 29/784 |

FOREIGN PATENT DOCUMENTS

| | | | |
|---|---|---|---|
| 76950 | 5/1985 | Japan | 29/799 |
| 124229 | 5/1990 | Japan | 29/799 |
| 284827 | 11/1990 | Japan | 29/799 |
| 26450 | 2/1991 | Japan | 29/711 |
| 104542 | 5/1991 | Japan | 29/799 |
| 1491663 | 7/1989 | U.S.S.R. | 29/799 |

Primary Examiner—Timothy V. Eley
Attorney, Agent, or Firm—Ronald P. Kananen

[57] ABSTRACT

An assembling apparatus which can readily achieve change-over among operation programs corresponding to a large number of works of different models. Part pallets on which parts are received are supplied from a part supplying unit to a plurality of assembling units by a part pallet supplying conveyor. Meanwhile, assembling pallets are supplied from a model changing unit to the assembling units by an assembling pallet transporting conveyor. Each of the assembling units is provided with an orthogonal robot wherein an assembling head picks up a part from a part pallet supplied thereto and automatically mounts the part to a work on an assembling pallet supplied thereto.

13 Claims, 12 Drawing Sheets

ASSEMBLING APPARATUS USING ROBOT

BACKGROUND OF THE INVENTION

1. Field of the Invention

This invention relates to an assembling apparatus employing a robot, and more particularly to an assembling apparatus which includes a plurality of assembling units having substantially the same functions and which is suitable to effect automatic assembly.

2. Description of the Related Art

Assembling robots have been and continue to be widely used to automatically assemble various electronic appliances. An exemplary, conventional assembling apparatus which employs an assembling robot is disclosed, for example, in U.S. Pat. No. 4,783,904. In the assembling apparatus, trays on which parts are arranged in a predetermined order are supplied by transport means to and stored in a stock station, and a robot selectively picks up one of the trays stored in the stock station and places the tray onto a part pickup station. Then, the robot selectively picks up one of parts, depending upon the determination of the robot, from within the tray in the part pickup station and effects automatic assembly using the thus picked up part. The robot is characterized in that it includes a plurality of horizontal, articulated robots, by which assembly of a plurality of parts is performed. The assembling apparatus, however, is disadvantageous in that, when the model of the work is to be changed, the operation program therefor cannot be changed readily and much time is required for a change of the program. It is further disadvantageous in that the horizontal, articulated robot results in low positioning accuracy.

As the needs of the market diversify, the form of production tends to change from the mass production of a single model to an average production of a plurality of models and further to a short production of a large number of models. As the size of production changes in this manner, a requirement for an assembling robot is a function of changing over the operation program therefor in a short period of time and in accordance with the model of the works so as to cope with the model. Further, as the miniaturization of electronic appliances to be assembled proceeds, a high degree of positioning accuracy is required in assembly.

SUMMARY OF THE INVENTION

It is an object of the present invention to provide an assembling apparatus which can readily achieve change-over among operation programs for a large number of works of different models.

In order to attain the object, according to the present invention, there is provided an assembling apparatus, employing a robot, which comprises a plurality of assembling units having substantially similar functions, a part supplying unit for arranging parts necessary for assembly on a part pallet and supplying the parts together with the part pallet, an assembling pallet supplying unit for supplying an assembling pallet on which assembly of a part, which is picked up by any of the assembling units from a part pallet arriving thereat, is to be performed, a pair of transporting means disposed on the opposite sides of the assembling units for individually transporting a part pallet and an assembling pallet, means for counting the number of works of a first model being assembled, and means for automatically changing the effective assembling program from an assembling program for works of the first model to another assembling program for works of a second model when the count value of the counting means reaches a predetermined value, the effective assembling program changing means successively instructing a change between different models to the assembling units. Each of the assembling units may include an X-axis arm and a Y-axis arm extending orthogonally to each other.

In the assembling apparatus, a pallet on which necessary parts for assembly are arranged in a predetermined order is supplied from the part supplying unit and is transported to a corresponding one of the assembling units by the transporting means therefor. Meanwhile, an assembling pallet which is used to effect assembly thereon is transported to a corresponding one of the assembling units by the transporting means therefore. Accordingly, at each of the assembling units, an assembling operation proceeds such that a part supplied thereto by means of a part pallet is picked up and mounted on an assembling pallet supplied thereto. The assembling pallet is successively transported to the assembling units on the downstream side, by which an assembling operation is subsequently performed on the assembling pallet to effect automatic assembly.

Meanwhile, the number of works of the model being currently assembled is counted by the counting means, and when the count value reaches a predetermined number, the assembling apparatus is automatically prepared for works of a next model. The preparation is performed by successively down-loading a change between different models to the assembling units. Accordingly, at a stage at which a predetermined number is reached, changing over to a next model is automatically performed by the assembling apparatus. Accordingly, with the assembling apparatus, changing over between different models is performed while assembly proceeds.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
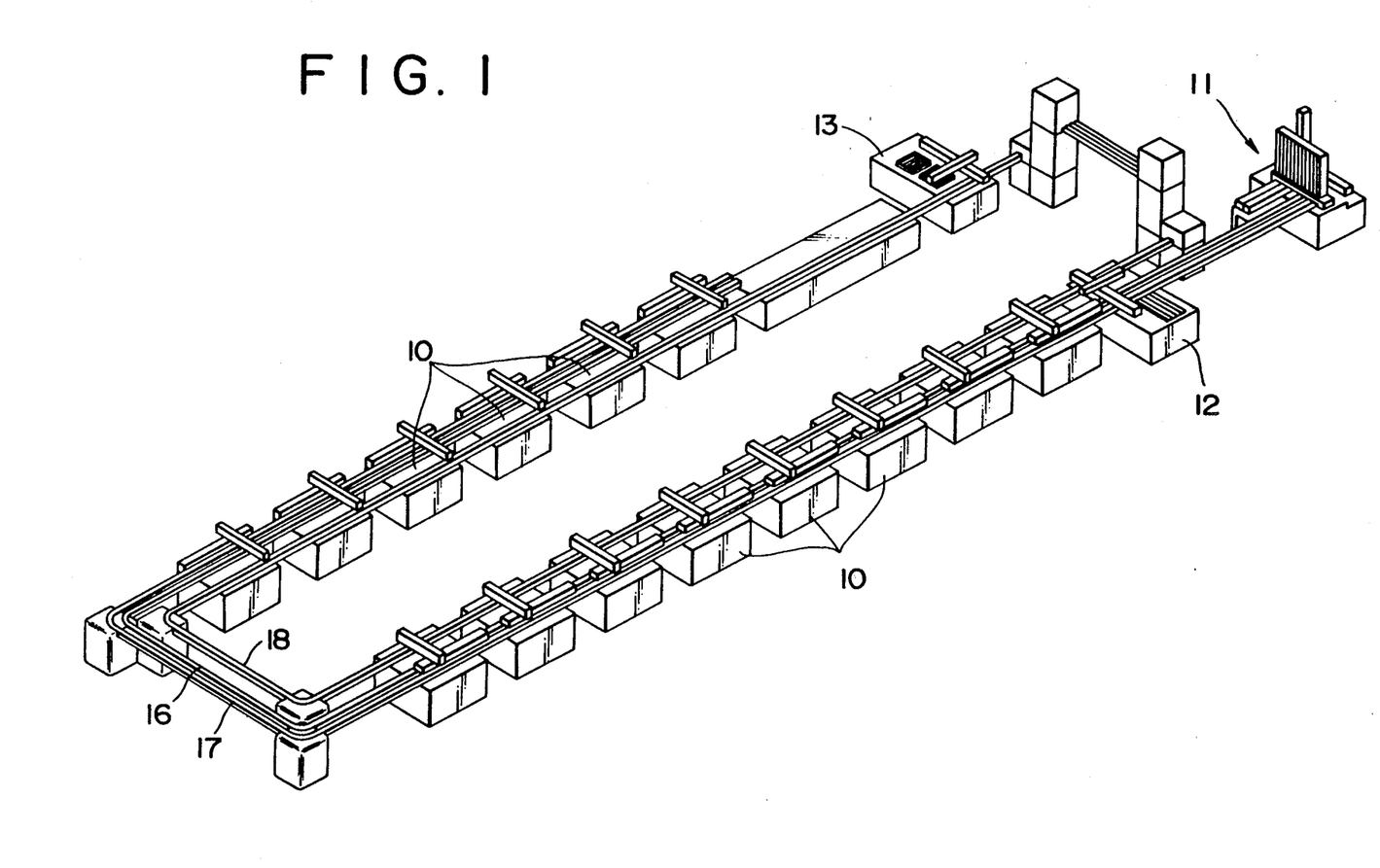
FIG. 1 is a perspective view of an entire assembling apparatus showing a first preferred embodiment of the present invention.

Referring first to FIG. 1, there is shown an entire arrangement of an automatic assembling apparatus according to a first preferred embodiment of the present invention. The assembling apparatus shown includes a combination of a total of 14 assembling units, generally denoted by the numeral 10, including orthogonal robots having the same functions. The assembling apparatus further includes a part supplying unit 11 and a model changing over unit 12. A carrying out unit 13 is located on the downstream side of a transport line which includes a part pallet supplying conveyor 16, a part pallet feeding back conveyor 17 and an assembling pallet transporting conveyor 18.

Figure 2:
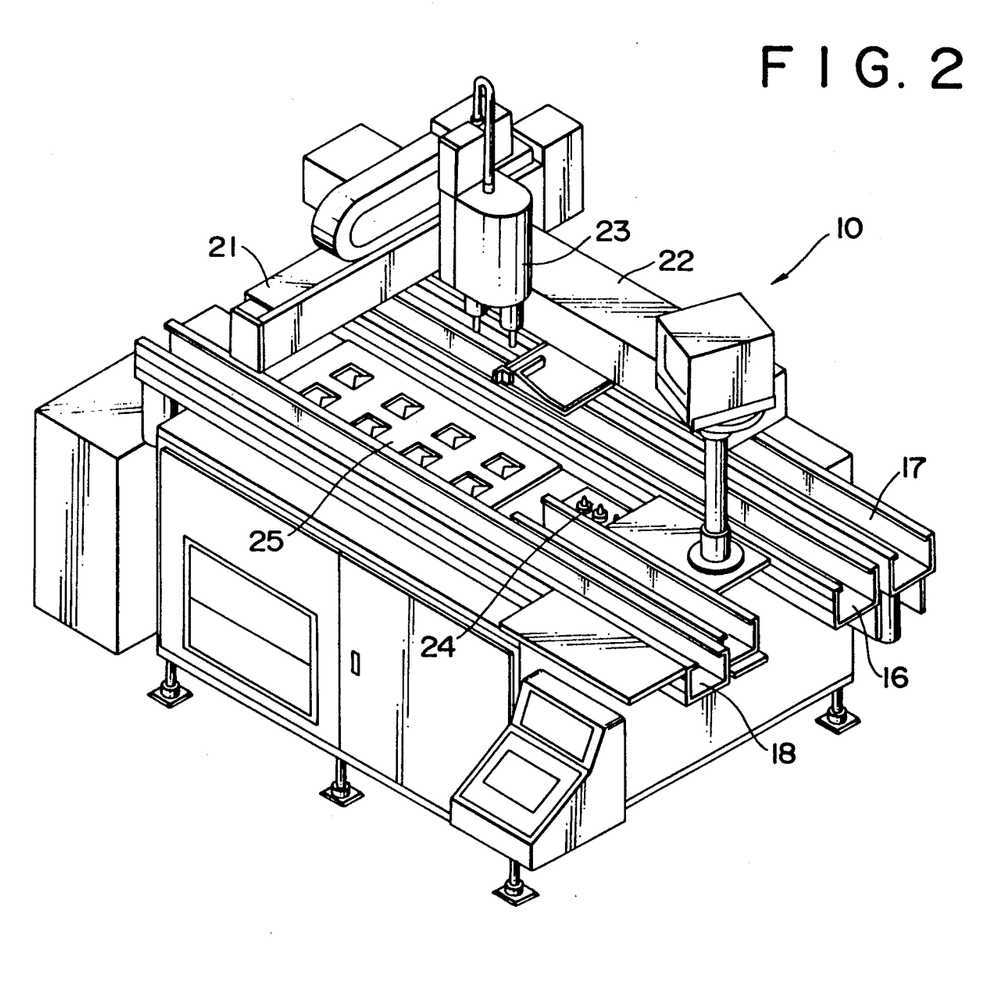
FIG. 2 is a perspective view of an assembling unit of the assembling apparatus shown in FIG. 1.

Detailed construction of the assembling units 10 of the assembling apparatus is shown in FIG. 2. Referring now to FIG. 2, each of the assembling units 10 is provided with an orthogonal robot and includes an X-axis direction moving unit 21 and a Y-axis direction moving unit 22. An assembling head 23 in the form of a multi-head is provided on the X-axis direction moving unit 21. The assembling head 23 has a main axis which coincides with the Z-axis direction. The assembling head 23 is capable of picking up an arbitrary one of several tools from a tool stand 24 and attaching the thus picked up tool to an end portion thereof.

The assembling unit 10 further includes a part pallet positioning table 25, and part pallets transported thereto by the part pallet supplying conveyor 16 are at once placed onto and held on the part pallet positioning table 25. The part pallet feeding back conveyor 17 is located alongside the part pallet supplying conveyor 16. On the other hand, the assembling pallet transporting conveyor 18 is located remote from the two conveyors 16 and 17 with respect to the assembling head 23.

Figure 3:
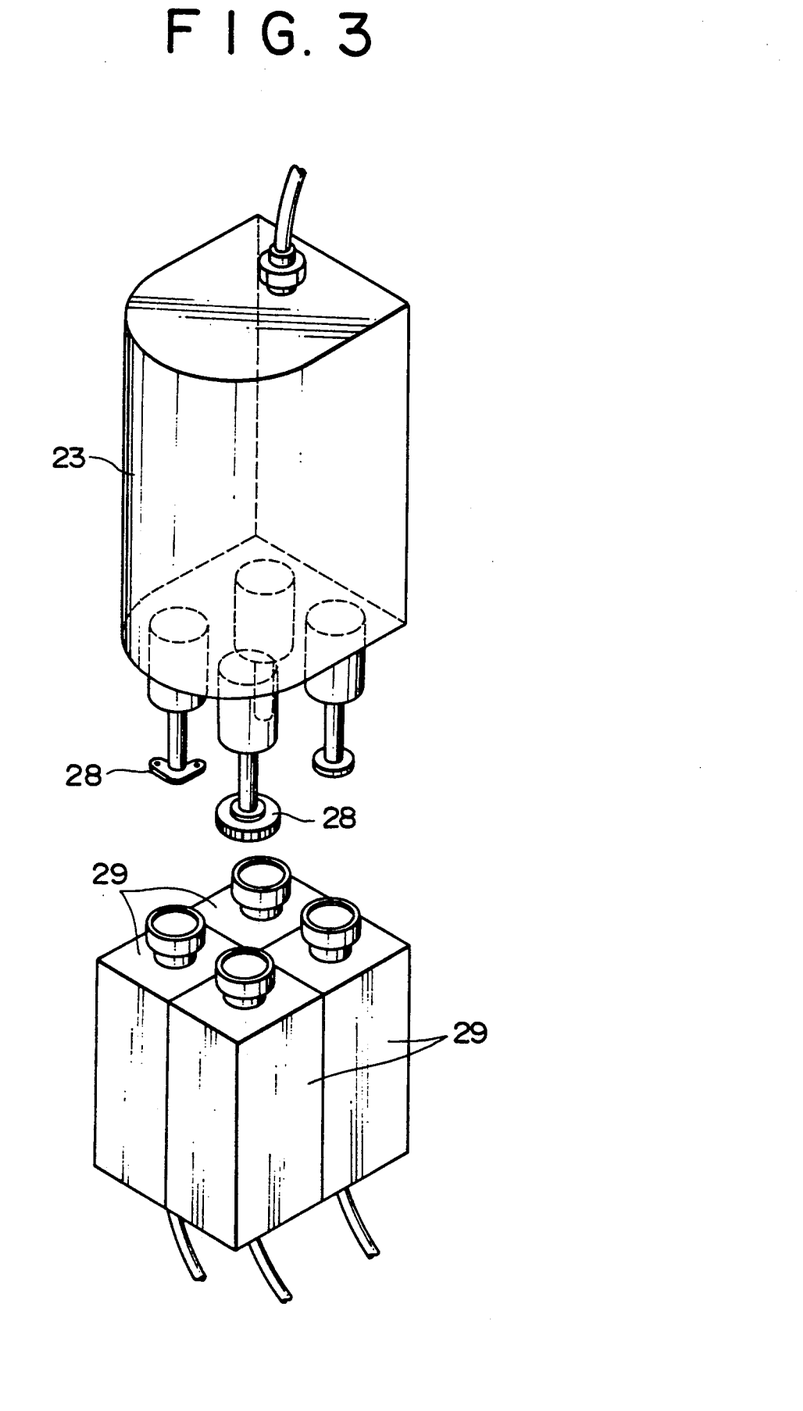
FIG. 3 is an enlarged perspective view of an assembling head of the assembling unit shown in FIG. 2.

Referring now to FIG. 3, the assembling head 23 of each assembling unit 10 includes, for example, four mount heads which can individually hold parts 28 at the end thereof. Each of the parts 28 carried at the ends of the assembling head 23 is photographed from below by a CCD (charge coupled device) camera 29 so that the mounted position thereof may be measured correctly by way of the CCD camera 29.

Figure 4:
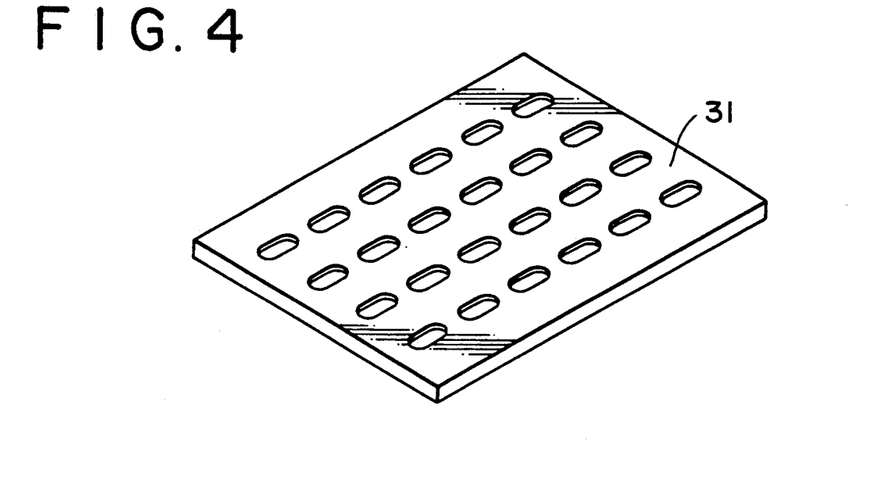
FIG. 4 is a perspective view showing a part pallet for exclusive use in the assembling apparatus shown in FIG. 1.

A part pallet which is supplied from the part supplying unit 11 and transported to any of the assembling units 10 by the part pallet supplying conveyor 16 ma be, for example, a part pallet 31 for exclusive use as shown in FIG. 4. Referring now to FIG. 4, the part pallet 31 has a plurality of recesses having a shape conforming to a shape of a part to be supplied so that parts may be received in a fixed posture in a predetermined arrangement in the recesses. Such pallet 31 is supplied by way of the conveyor 16 and introduced onto the positioning table 25 of an assembling unit 10, and a part is thereafter picked up from the pallet 31 on the positioning table 25 by means of a chuck of the head 23.

Figure 5:
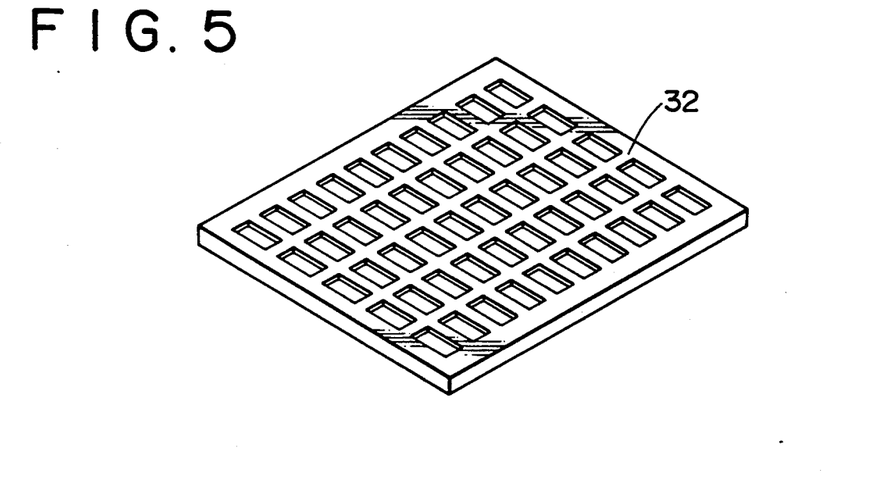
FIG. 5 is a perspective view showing a part pallet for general use in the assembling apparatus shown in FIG. 1.

FIG. 5 shows another part pallet 32 which is constructed as a part pallet for general use. In particular, referring to FIG. 5, the part pallet 32 shown has a predetermined number of recesses having a fixed shape, for example, a rectangular shape, of a predetermined size so that parts which are smaller than the recesses may be received in a predetermined arrangement in the recesses. Therefore, according to the pallet 32, the type of parts to be supplied thereby is not limited. In other words, various parts can be supplied to any of the assembling units 10 by way of the pallet 32 so long as the parts are smaller than the recesses.

Figure 6:
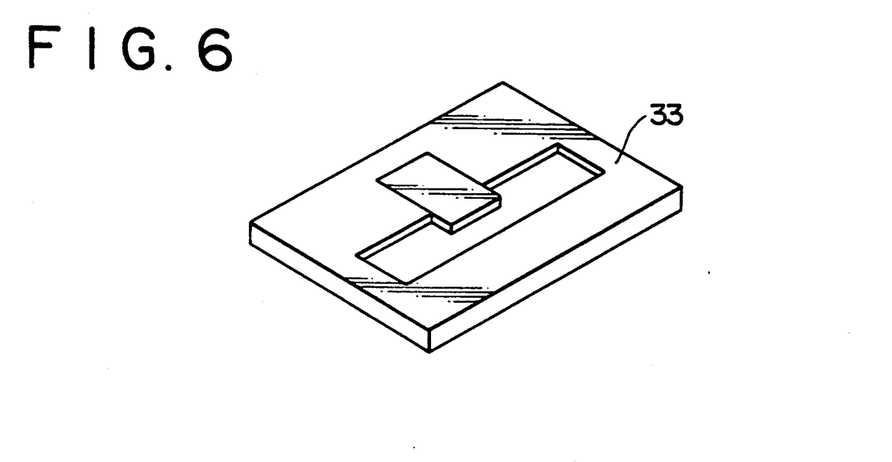
FIG. 6 is a perspective view showing an assembling pallet which is used in the assembling apparatus shown in FIG. 1.

FIG. 6 shows an assembling pallet 33 which is supplied to an assembling unit 10 by way of the pallet transporting conveyor 18. The pallet 33 is designed so that assembly is performed thereon, and when, for example, a tape recorder is to be assembled by the present assembling apparatus, a mechanism chassis for the tape recorder is placed on and supplied by way of the assembling pallet 33. Consequently, various parts are assembled to the chassis on the pallet 33 each time the pallet 33 passes an assembling unit 10.

Figure 7:
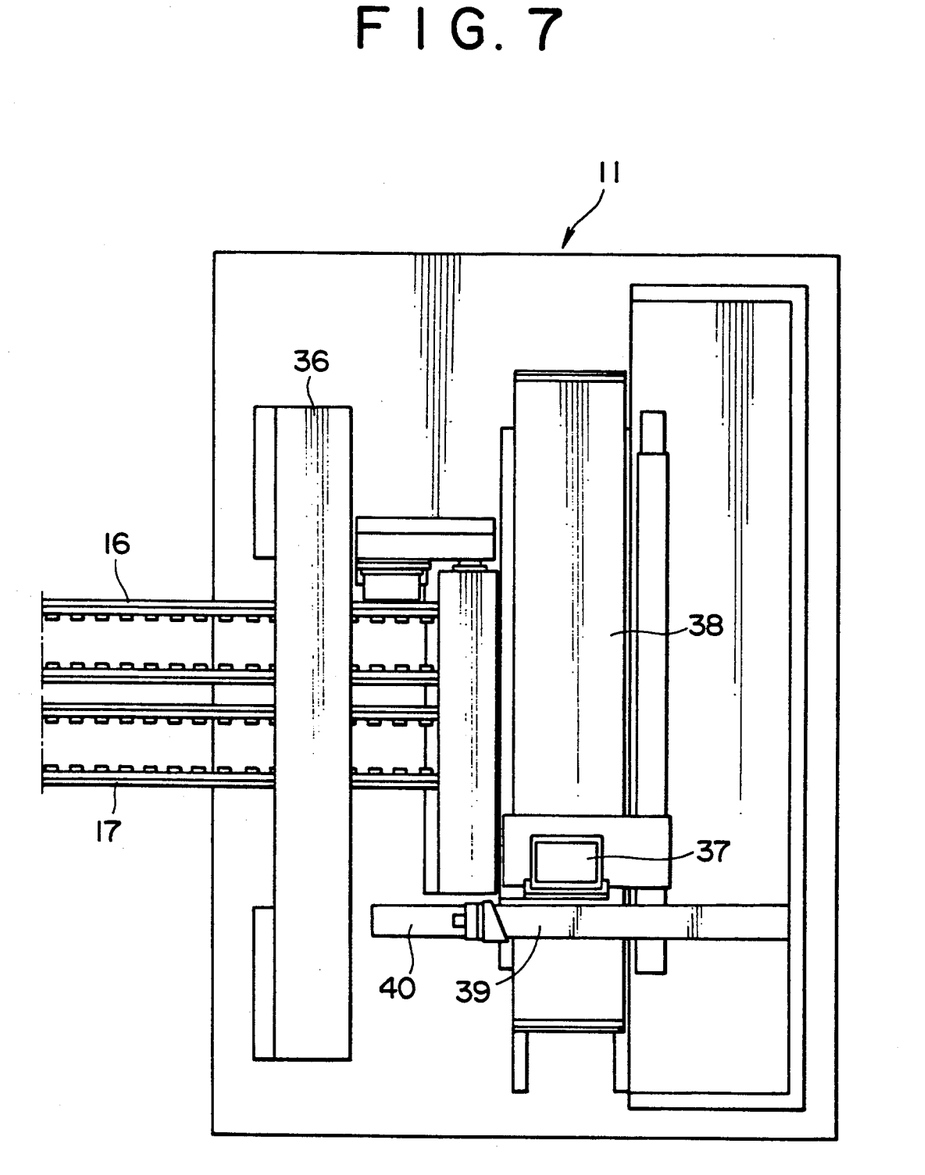
FIG. 7 is a plan view of a part supplying unit of the assembling apparatus shown in FIG. 1.
Figure 8:
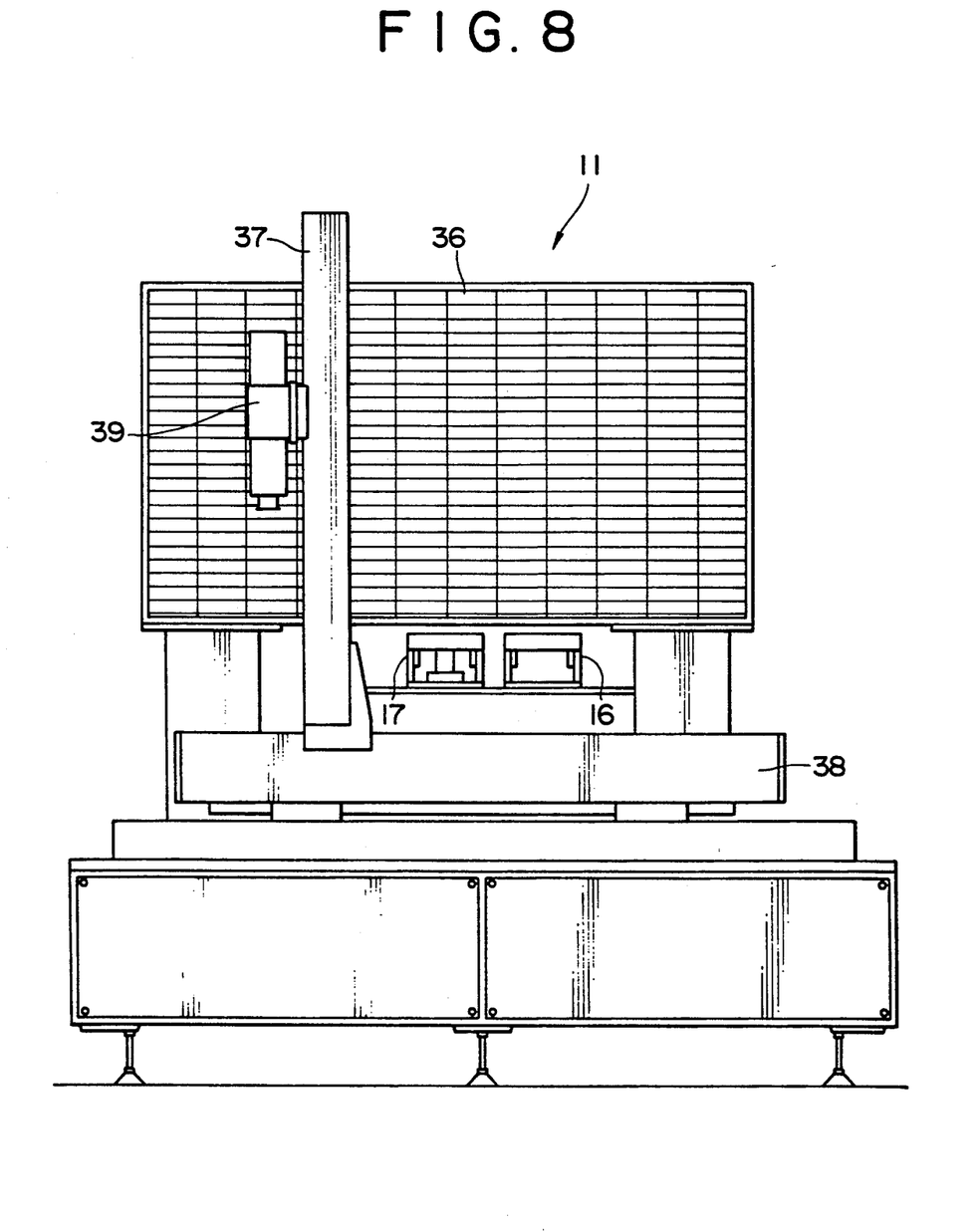
FIG. 8 is a front elevational view of the part supplying unit shown in FIG. 7.
Figure 9:
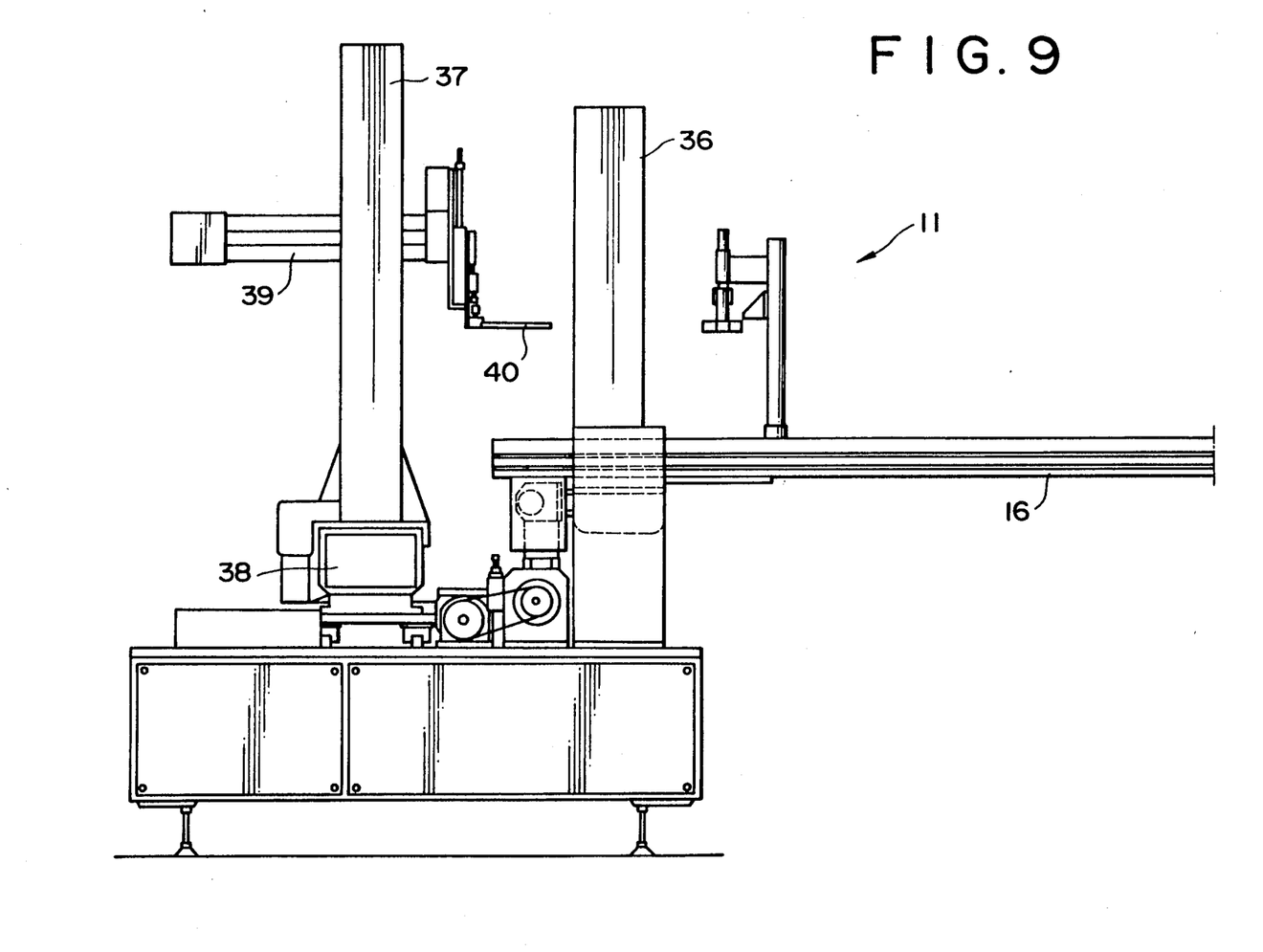
FIG. 9 is a side elevational view of the part supplying unit shown in FIG. 7.

FIGS. 7 to 9 show the part supplying unit 11. Referring to FIGS. 7 to 9, the supplying unit 11 includes a pallet rack 36, which is like a boot cupboard as particularly seen in FIG. 8. The pallet rack 36 has a large number of accommodating portions sectioned by vertical plates and horizontal plates so that a part pallet 31 for exclusive use or a part pallet 32 for general use, in which parts 28 are accommodated, may be accommodated in each of the accommodating portions.

The part supplying unit 11 includes an X-axis direction moving unit 37 and a Y-axis direction moving unit 38 located in front of the pallet rack 36. The X-axis direction moving unit 37 moves a Z-axis direction moving unit 39 in a vertical direction with respect to the pallet rack 36. Meanwhile, the Y-axis direction moving unit 38 moves the X-axis direction moving unit 37 in a horizontal direction with respect to the pallet rack 36. The Z-axis direction moving unit 39 has a pallet picking up arm 40 at an end thereof as shown in FIGS. 7 and 9 so that a part pallet 31 or 32 may be picked up from a predetermined position of the pallet rack 36 by means of the arm 40.

Figure 10:
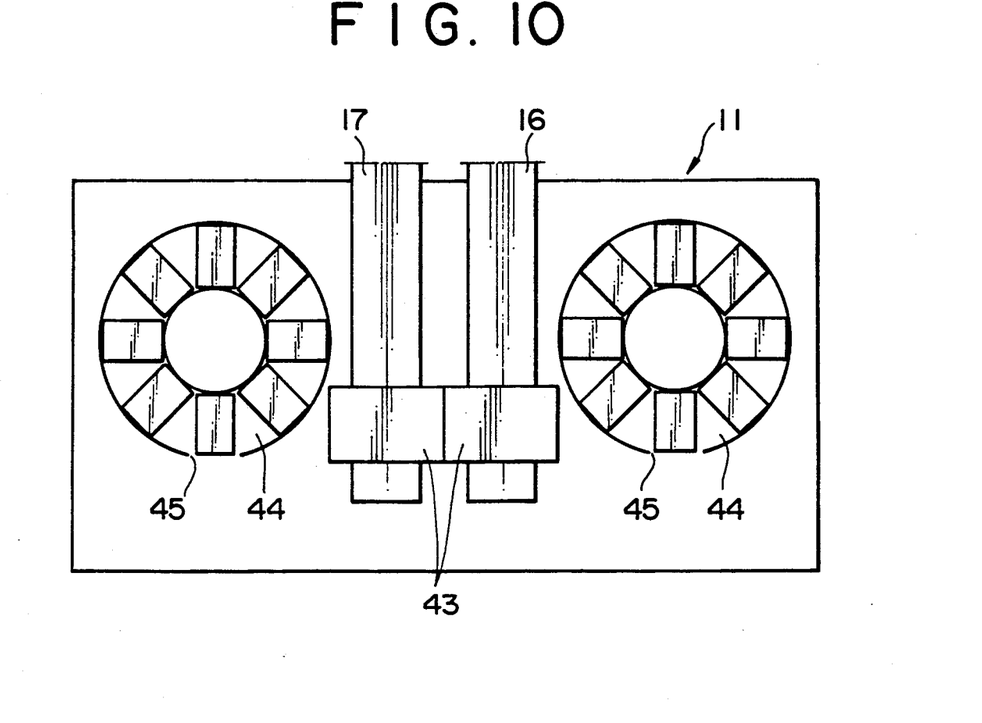
FIG. 10 is a plan view of a modification of the part supplying unit shown in FIG. 7.
Figure 11:
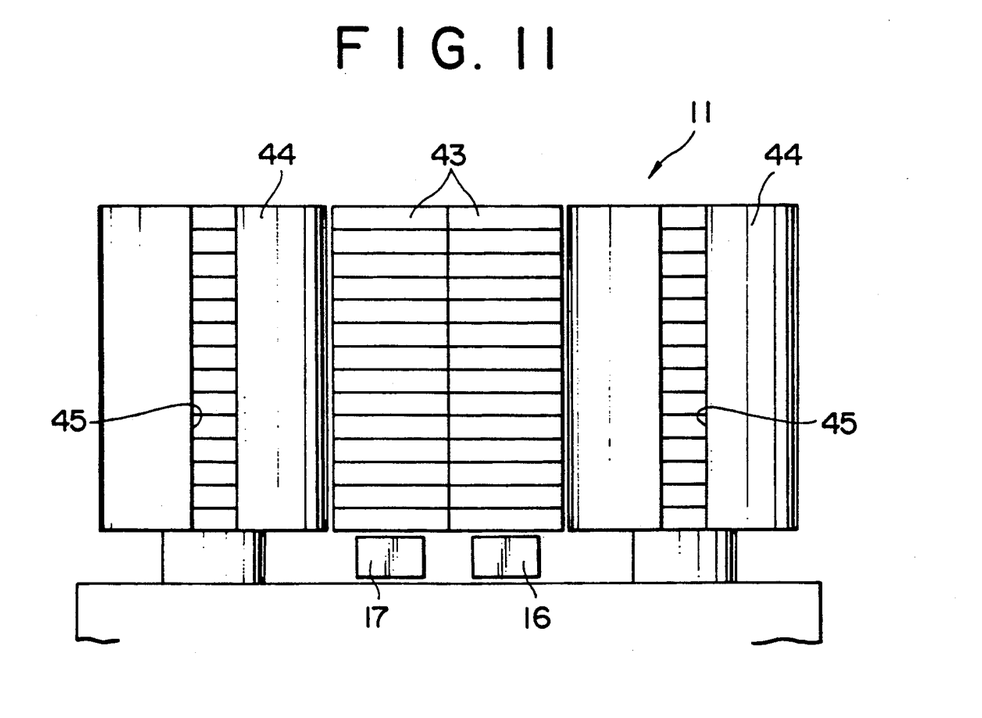
FIG. 11 is a front elevational view of the modified part supplying unit shown in FIG. 10.
Figure 12:
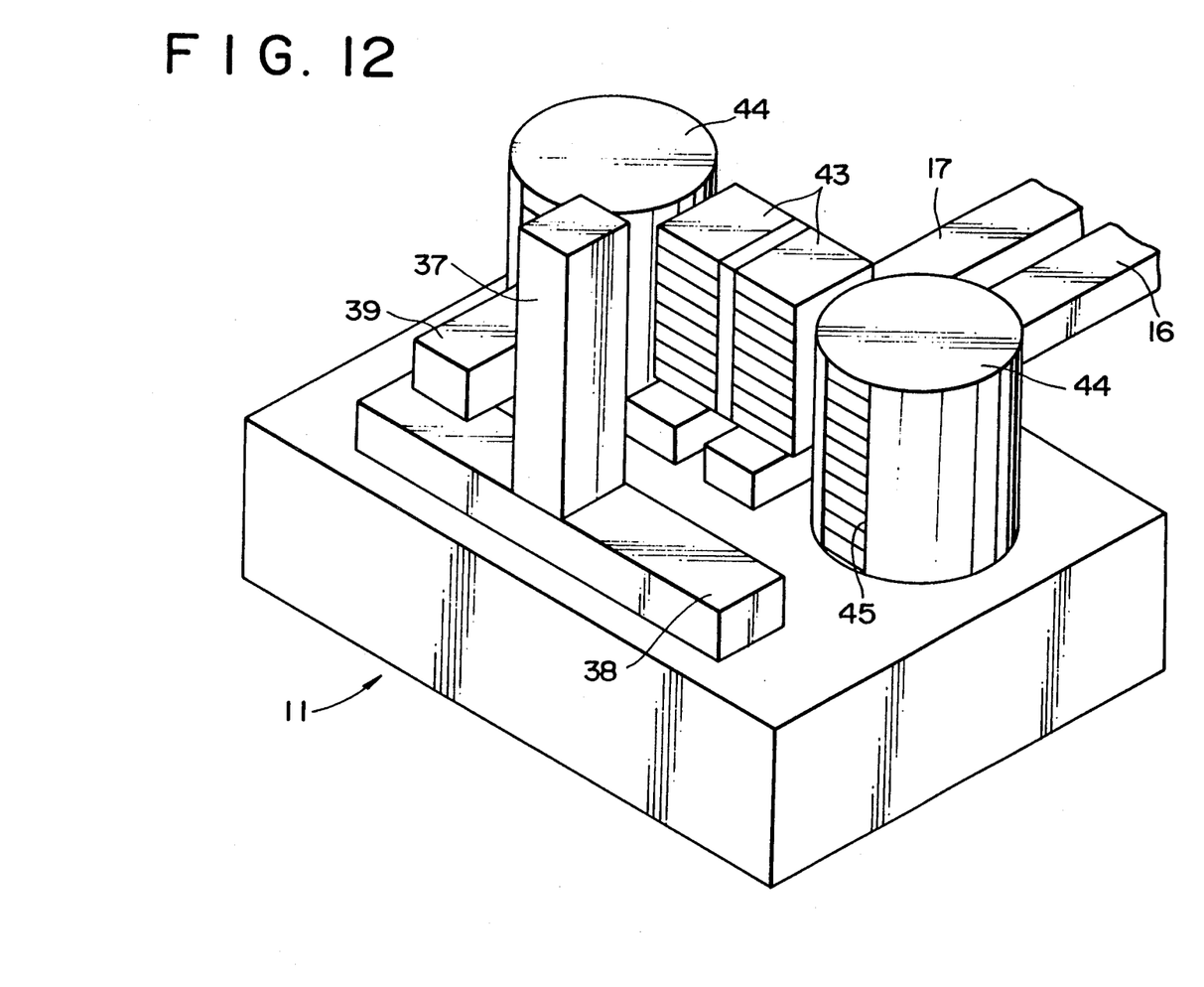
FIG. 12 is a perspective view of the modified part supplying unit shown in FIG. 10.

FIGS. 10 to 12 show a modification of the part supplying unit 11 shown in FIGS. 7 to 9. The modified supplying unit, also denoted by the numeral 11, includes a pair of fixed pallet racks 43, which are like boot cupboards, and a pair of rotary pallet racks 44 disposed on the opposite sides of the fixed pallet racks 43. The rotary pallet racks 44 are individually supported for rotation around vertical axes and each has an opening 45 provided on the front side of a circumferential wall so that a pallet may be picked up from a portion of the rotary pallet rack 44 opposing the opening 45 by means of an arm. With such a construction, an increased number of part pallets 31 and/or 32 can be stored due to the presence of the rotary pallet racks 44, which allows assembly of a work which involves a large number of parts to be assembled.

Figure 13:
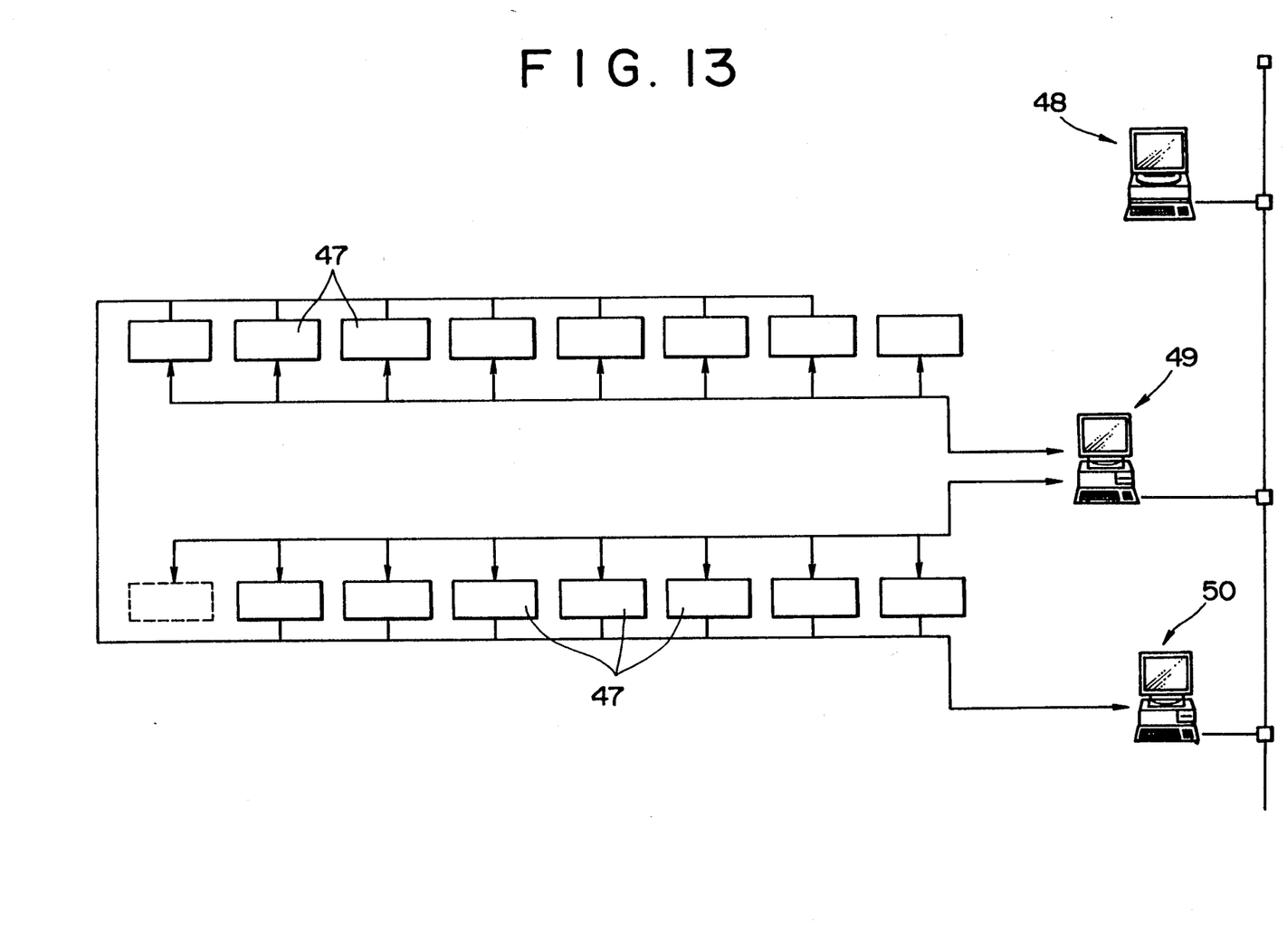
FIG. 13 is a block diagram showing a control system for the assembling apparatus shown in FIG. 1.

Referring now to FIG. 13, there is shown a control system for the entire assembling apparatus described above. Each of the assembling units 10 includes a corresponding controller 47. The controllers 47 are connected to a host computer 48 by way of a line controlling computer 49. A part-managing computer 50, which is connected to the host computer 48 and the line computer 49, executes management of the parts.

An automatic assembling operation of the assembling apparatus is subsequently described. Parts necessary for the assembly are accommodated in the pallet rack 36 shown in FIG. 8, while received on pallets 31 or/and 32. The pallet picking up arm 40 is moved in the X-axis direction and the Y-axis direction and picks up a pallet 31 or 32 from a predetermined position within the pallet rack 36. The pallet 31 or 32 thus picked up is supplied to a predetermined assembling unit 10 by way of the part pallet supplying conveyor 16. At the assembling unit 10, the pallet 31 or 32 supplied thereto is placed onto the part pallet positioning table 25 by the assembling head 23. Thus, parts 28 required by the individual assembling units 10 are supplied to the assembling units 10 while received on pallets 31 or 32, and the parts 28 thereafter await the next operation on the part pallet positioning table 25.

Meanwhile, assembling pallets 33 for the assembly are supplied from the model changing unit 12. The assembling pallets 33 supplied from the model changing over unit 12 are individually supplied to respective assembling units 10 by the assembling pallet transporting conveyor 18.

An assembling operation at each of the assembling units 10 proceeds in the following manner. In particular, the assembling head 23 is moved by the X-axis direction moving unit 21 and the Y-axis direction moving unit 22 to a position where it picks up a necessary part from a pallet 31 or 32 on the pallet positioning table 25. The thus picked up part is held at the end of the assembling head 23 as shown in FIG. 3.

The part 28 held at the end of the assembling head 23 is photographed by the CCD camera 29 located just below the assembling head 23, and processing of an image of the part 28 thus photographed is executed by the CCD camera 29. The image processing by the CCD camera 29 is characterized in that final image processing is performed which includes a displacement of the part 28 when chucked by the assembling head 23. Thus, a final position of the part 28 grasped by the assembling head 23 is detected. Accordingly, an accumulated error does not occur, and a part can be assembled accurately.

Assembly of a part is performed by mounting the part 28 grasped by the assembling-head 23 on a work on an assembling pallet 33 supplied by way of the transporting conveyor 18, and after the part 28 is placed onto a work on the assembling pallet 33, the assembling-head 23 releases the part 28 therefrom in this condition.

Such an assembling operation as described above is performed successively at the assembling units 10, and after assembly at each of the assembling units 10 is completed, the assembling pallet 33 is transported to a next assembling unit 10 on the downstream side by means of the transporting conveyor 18. A predetermined electronic appliance is finally assembled on the assembling pallet 33 in this manner. The thus assembled electronic appliance is discharged from the conveyor line 18 by the carrying out unit 13. The pallet 33 from which the work has been removed is returned to the model changing unit 12. Meanwhile, the part pallet 31 or 32, from which all parts 28 have been picked up at each assembling unit 10, is transferred from the pallet positioning table 25 to the part pallet feeding back conveyor 17, by which means it is thereafter returned to the part supplying unit 11. Consequently, the empty part pallet 31 or 32 is filled with parts in the supply unit 11 and then accommodated in the pallet rack 36 in preparation for the next picking up operation thereof.

Figure 14:
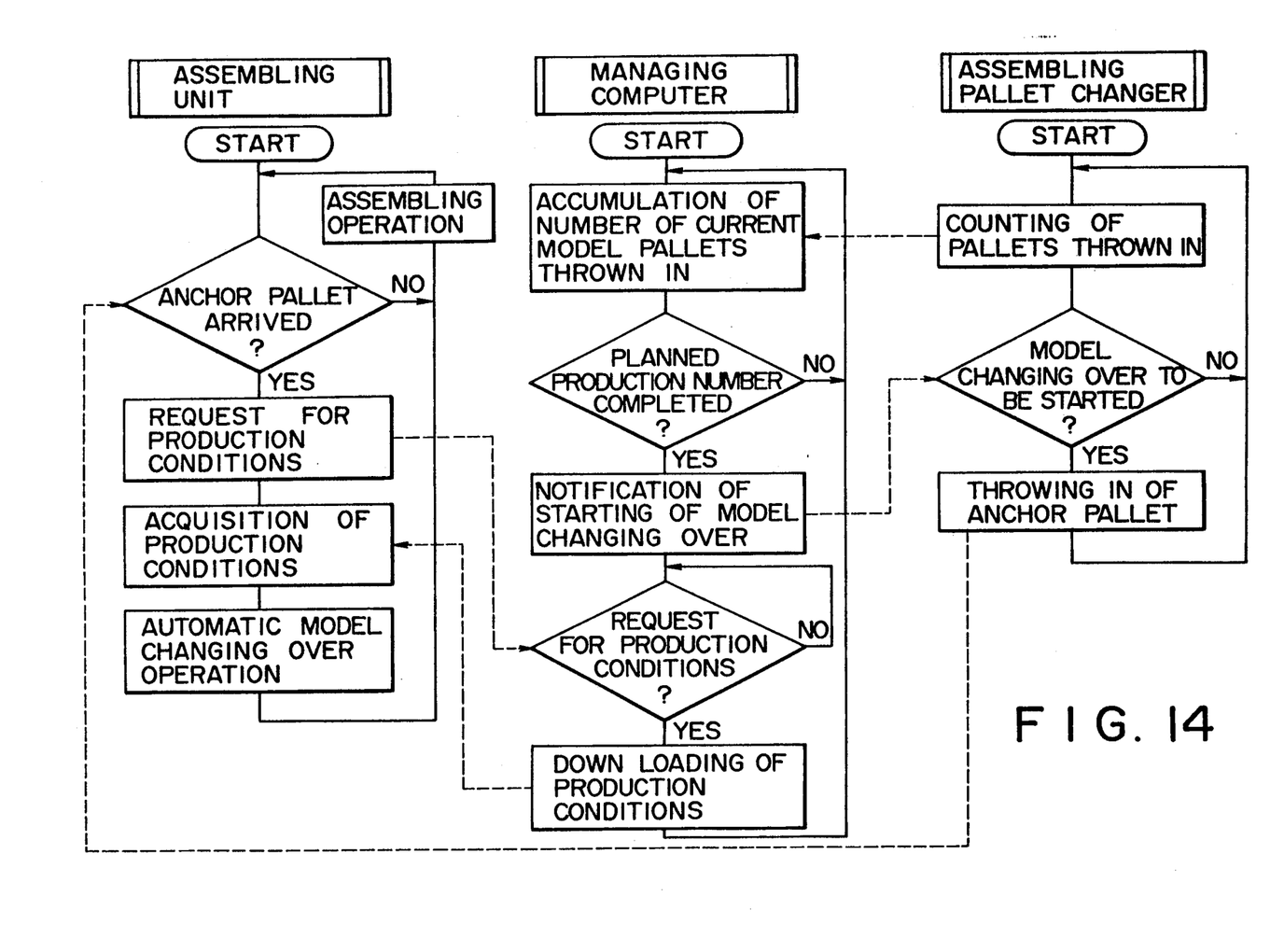
FIG. 14 is a flow chart illustrating a changing over operation of a model by the control system shown in FIG. 13.

Subsequently, an operation of changing a lot in the assembling apparatus is described. The lot changing operation is performed automatically by the controlling apparatus shown in FIG. 13. Referring now to FIG. 14, the line controlling computer 49 accumulates the number of pallets of a current model thrown into the line to count the number of works of a model being assembled currently. The line controlling computer 49 then continues to supply pallets until a predetermined number of products is completed, and delivers, when the predetermined number of products is reached, a work model changing over starting instruction. In response to the work model changing over starting instruction, the model changing unit 12 delivers an anchor pallet, having discriminating means, as a last pallet for the current model by way of the assembling pallet transporting conveyor 18. After the anchor pallet is thrown in, each of the assembling units 10 confirms arrival of the anchor pallet and requests production conditions from the line controlling computer 49. Then, if the request for production conditions is received, the line controlling computer 49 successively down-loads the production conditions to the assembling units 10. Accordingly, each of the assembling units 10 acquires production conditions therefor and performs an automatic model changing over operation. Consequently, when the number of works of the current model reaches the predetermined value, changing over to a next model is performed automatically, and the production conditions for the model are successively down-loaded to the individual assembling units 10 so that the model changing over is achieved automatically.

With the assembling apparatus described above, when assembly of a predetermined number of works is completed, changing over to a next model is performed automatically, and consequently, the assembling apparatus can cope flexibly with a short production run of many types of models while also providing a timely production of many models. Moreover, at each of the assembling units 10, tools held in advance on the tool stand 24 can be automatically changed over, and consequently, since all of the assembling units 10 have the same functions, they can perform individual assembling operations different from each other. Consequently, the operation program can be changed over readily for various work types.

Further, in the present assembling apparatus, a part 28 held by the assembling head 23 of each of the assembling units 10 is photographed by the corresponding CCD camera 29, and a final position of the part 28 held by the assembling head 23 is image processed by the CCD camera 29. Accordingly, accurate assembly can be performed without production of an accumulated error, and consequently, assembly of precision machinery or the like is possible.

Moreover, the assembling apparatus includes the part supplying unit 11 which includes the pallet rack 36 in which a large number of pallets 31 or 32 can be accommodated. Part pallets 31 for exclusive use, or part pallets 32 for general use, on which parts 28 are mounted are individually accommodated in the part-accommodating portions of the pallet rack 36, and a predetermined pallet 31 or 32 is picked up by means of the pallet picking up arm 40 on the Z-axis direction moving unit 39 which is moved by the X-axis direction moving unit 37 and the Y-axis direction moving unit 38. Accordingly, a large number of parts 28 can be stored in advance in the pallet rack 36 and a predetermined one of the parts 28 can be picked up automatically from the pallet rack 36. If an automatically readable identification mark is applied to each of part pallets 31 and 32, then automation of the supply of parts is achieved.

A pallet supplying system such as that described above not only can be applied to the supply and storage of small parts for the assembly, but it also functions as a buffer against a fluctuation within the system or some other trouble. Further, the pallet supplying system is also utilized for preparations for changing over to a next model, and it is possible to store parts for the next model in advance in the pallet rack 36. Moreover, it is possible to prepare, in advance, jigs, tools and so forth on a pallet 31 or 32 and supply those jigs and tools to an assembling unit 10 by way of the part pallet 31 or 32 by the part pallet transporting conveyor 16, which can enhance the assembling function of the assembling apparatus.

Figure 15:
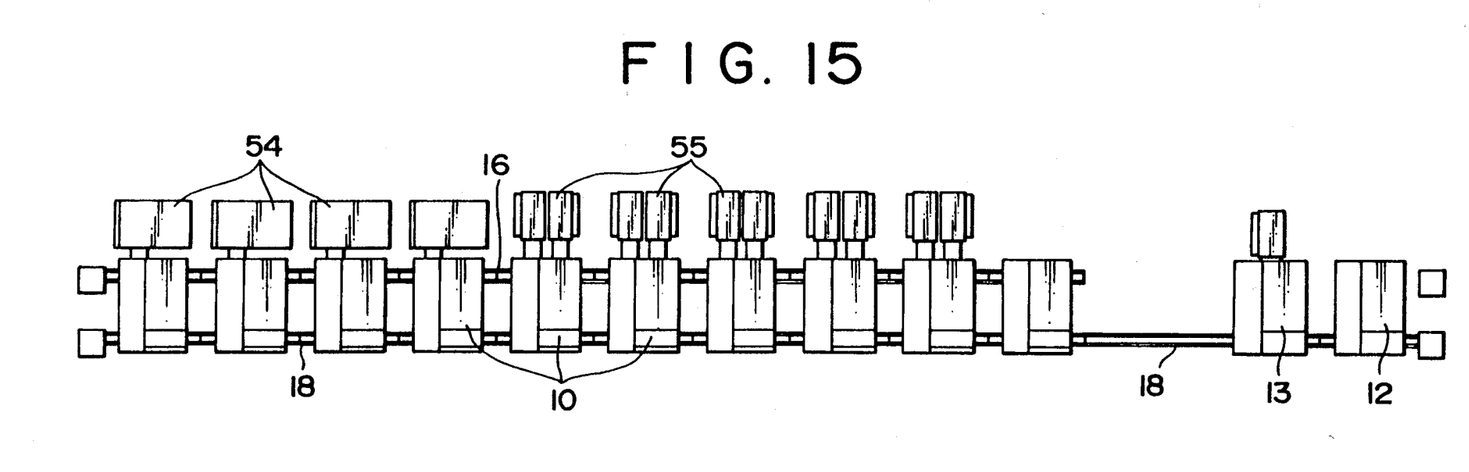
FIG. 15 is a plan view of another assembling apparatus showing a second preferred embodiment of the present invention.
Figure 16:
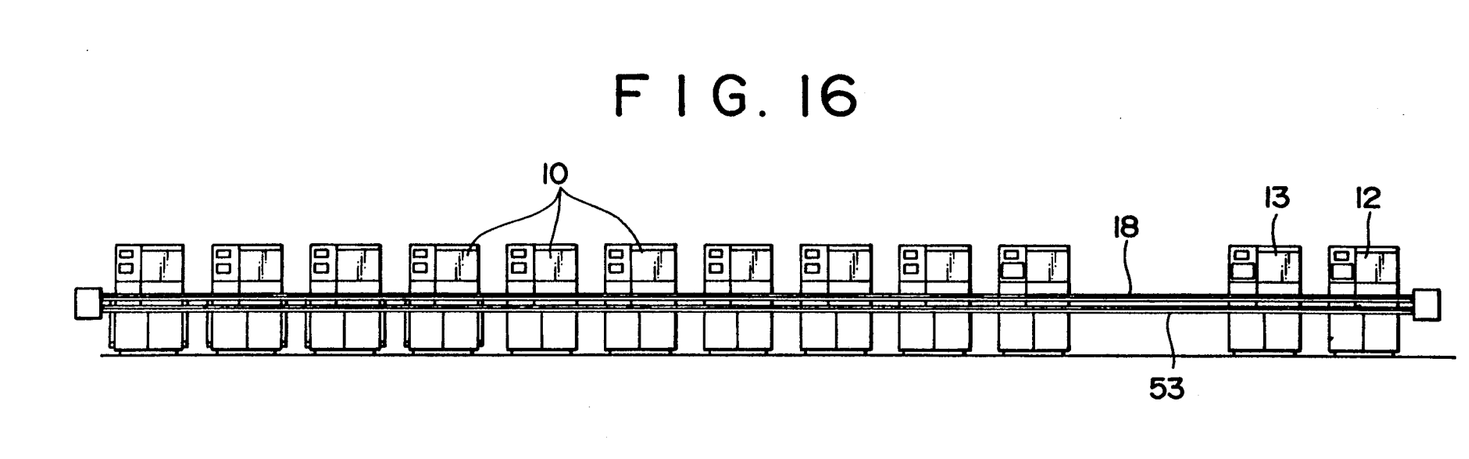
FIG. 16 is a front elevational view of the assembling apparatus shown in FIG. 15.

Referring now to FIGS. 15 and 16, there is shown another assembling apparatus according to a second preferred embodiment of the present invention. The present assembling apparatus represents a modification of the assembling apparatus shown in FIG. 1 in that the assembling units 10 are provided in an in-line arrangement as particularly seen from a comparison with the assembling apparatus shown in FIG. 1. The present assembling apparatus, however, includes a combination of a total of ten such assembling units 10, with an oscillation-type part supplier 54 provided for four of the assembling units 10 and with a pallet changer 55 provided for five of the remaining assembling units 10.

The assembling pallet transporting conveyor 1 extends such that it interconnects the assembling units 10 to the model changing unit 12 and the carrying out unit 13. An assembling pallet feeding back conveyor 53 is disposed below the assembling pallet transporting conveyor 18 as shown in FIG. 16. Also the part pallet transporting conveyor 16 and the part pallet feeding back conveyor 17 are disposed at two levels such that the former is located above the latter.

The conveyors 16 and 17 not only interconnect the assembling units 10 but also interconnect the oscillation-type part suppliers 54 and the pallet changers 55. Each of the oscillation-type part suppliers 54 arranges parts in position in the recesses of a part pallet 31 for exclusive use by means of oscillations. Meanwhile, each of the pallet changers 55 has a function of exchanging a pallet. Also, in the assembling apparatus of the present embodiment, an assembling operation is basically similar to that of the assembling apparatus of the preceding embodiment, and thus, an automatic lot changing operation is performed.

Having now fully described the invention, it will be apparent to one of ordinary skill in the art that many changes and modifications can be made thereto without departing from the spirit and scope of the invention as set forth herein.

What is claimed is:

1. An assembling apparatus employing a robot, comprising:

a plurality of assembling units, each of said assembly units performing at least one assembly operation and including means for performing assembly operations which are performed by the others of said plurality of assembly units;

a part supplying unit for arranging parts necessary for assembly of a first model on a parts pallet and supplying the parts together with the parts pallet;

an assembling pallet supplying unit for supplying an assembling pallet on which assembly of a part, which is picked up by any of said assembling units from a parts pallet arriving thereat, is to be performed;

a pair of transporting means disposed on opposite sides of said assembly units for individually transporting a parts pallet and said assembling pallet;

means for counting the number of units of said first model being assembled to provide a count value for said number; and means for automatically changing the effective assembling program from a first assembling program for production of said first model to a second assembling program for production of a second model, said changing means changing from said first assembling program to said second assembly program when the count value provided by said counting means reaches a predetermined value;

wherein said changing means successively provides change instructions to said assembling units indicating the model to be assembled.

2. An assembling apparatus employing a robot according to claim 1, wherein each of said assembling units includes an X-axis arm and a Y-axis arm extending orthogonally with respect to each other.

3. An assembling apparatus employing robot according to claim 2, wherein each of said plurality of assembly units further includes a part pallet positioning table said part pallet positioning table receiving parts transported one of said pair of transporting means.

4. An assembling apparatus employing robot according to claim 3, further including a part pallet feeding back conveyor positioned alongside one of said pair of transporting means.

5. An assembling apparatus employing robot according to claim 1, wherein each of said plurality of assembly units further includes an assembling head upon which least one of a plurality of tools is attached.

6. An assembling apparatus employing robot according to claim 5, wherein said assembling head includes a plurality of mount heads each of which can hold said parts.

7. An assembling apparatus employing robot according to claim 6, wherein each of said plurality of assembly units further includes a CCD camera for measuring the position of said parts when held by said mount heads.

8. An assembling apparatus employing robot according to claim 1, wherein said part supplying unit includes a pallet rack having a plurality of accommodating portions for holding a plurality of parts pallets.

9. An assembling apparatus employing robot according to claim 8, wherein said part supplying unit includes a moving unit for transporting said parts pallets from said pallet rack to one of said pair of transporting means.

10. An assembling apparatus employing robot according to claim 9, wherein said pallet rack has a cupboard construction including a plurality of portions section by vertical and horizontal plates.

11. An assembling apparatus employing robot according to claim 9, wherein said pallet rack rotates about a vertical axis and has an opening so that a pallet rack stored therein may be removed with said transporting means.

12. An assembling apparatus employing robot according to claim 1, wherein said changing means includes a model changing unit which supplies an anchor pallet, said anchor pallet being recognizable by said plurality of assembly units as providing parts for a last unit of said first model, thereby causing each of said plurality of assembly unit to provide an indication that said anchor pallet has arrived.

13. An assembling apparatus employing robot according to claim 12, wherein said changing means further includes a line controlling computer which supplies production conditions to said plurality of assembly units, said production conditions indicating which of said models are to be assembled.

* * * * *